(12) United States Patent
Nemeth (10) Patent No.: US 6,612,512 B1
(45) Date of Patent: Sep. 2, 2003

(54) RECORDING AND/OR REPRODUCING DEVICE HAVING A PULL-OUT ELEMENT AND HAVING MEANS FOR MOVING THE PULL-OUT ELEMENT INTO ITS NOMINAL POSITION

(75) Inventor: Robert Nemeth, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/711,229

(22) Filed: Nov. 13, 2000

(30) Foreign Application Priority Data

Nov. 11, 1999 (EP) ............................................. 99890361

(51) Int. Cl.[7] .............................. G03B 1/58; G11B 15/66
(52) U.S. Cl. .................................................. 242/332.4
(58) Field of Search ........................... 242/332.4; 360/95

(56) References Cited

U.S. PATENT DOCUMENTS

| | | | | |
|---|---|---|---|---|
| 4,828,201 A | * | 5/1989 | Smith | 242/195 |
| 6,034,839 A | * | 3/2000 | Hamming | 360/95 |
| 6,079,651 A | * | 6/2000 | Hamming | 242/332.4 |
| 6,092,754 A | * | 7/2000 | Rathweg et al. | 242/332.4 |
| 6,278,572 B1 | * | 8/2001 | Kletzl et al. | 360/95 |

FOREIGN PATENT DOCUMENTS

| | | | | |
|---|---|---|---|---|
| WO | WO0030090 | 5/2000 | ........... | G11B/15/67 |
| WO | WO0030091 | 5/2000 | ........... | G11B/15/67 |
| WO | WO0030092 | 5/2000 | ........... | G11B/15/67 |
| WO | WO0030093 | 5/2000 | ........... | G11B/15/67 |
| WO | WO0030094 | 5/2000 | ........... | G11B/15/67 |
| WO | WO0030095 | 5/2000 | ........... | G11B/15/67 |
| WO | WO0030096 | 5/2000 | ........... | G11B/15/67 |
| WO | WO0030097 | 5/2000 | ......... | G11B/15/675 |
| WO | WO0030098 | 5/2000 | ........... | G11B/17/00 |

\* cited by examiner

Primary Examiner—Donald P. Walsh
Assistant Examiner—Joseph C Rodriguez (57) ABSTRACT

In a recording and/or reproducing device (1) for a cassette (2) having a coupling element (6) connected to its magnetic tape (5) a pull-out element (24) has been provided, which is constructed to be coupled to the coupling element (6) and to pull the coupling element (6) out of the cassette (2) in a pull-out direction (10), and which is retained with the aid of a retaining member (35), which is movable between a standby position and an operating position, namely in a nominal position with respect to the retaining member (35) when it is not coupled to the coupling element (6), and after it has been coupled to the coupling element (6) is movable to a take-up reel (19) with the aid of a pull-out tape (60) and, when the retaining member (35) is situated in the area of its operating position, is retained so as to be movable with respect to the retaining member (35) against the pull-out direction (10) and which, when the retaining member (35) is moved from its operating position into its standby position, is movable into its nominal position with respect to the retaining member (35) in the undesirable situation that it does not occupy the nominal position.

3 Claims, 6 Drawing Sheets

RECORDING AND/OR REPRODUCING DEVICE HAVING A PULL-OUT ELEMENT AND HAVING MEANS FOR MOVING THE PULL-OUT ELEMENT INTO ITS NOMINAL POSITION

BACKGROUND OF THE INVENTION

1. Field of the Invention

The invention relates to a recording and/or reproducing device as defined in the opening part of claim 1.

2. Description of the Related Art

Such a recording and/or reproducing device is described in, for example, the two European priority patent applications of Nov. 12, 1998 having the application numbers 98 890 335.7 and 98 890 336.5. This known recording and/or reproducing device has already been shown at the Comdex fair of Las Vegas in the USA from Nov. 15, 1998 and is known therefrom.

For detachably retaining the pull-out element the retaining means in the known recording and/or reproducing device have been provided with two angled latching levers which are each loaded by a spring, which levers are movable between a latching position and a release position and are resiliently urged towards their latching positions by the springs. When the two latching levers are in their latching positions a latching portion of each of the two latching levers is disposed before a latching projection of the pull-out element viewed in the pull-out direction, as a result of which the latching levers guarantee that during normal operation the pull-out element cannot be moved in the pull-out direction as long as the pull-out element is not coupled to a cassette-mounted coupling element. The two latching levers are adapted to cooperate with the cassette-mounted coupling element, i.e. a coupling pin, of a cassette that has been loaded into the recording and/or reproducing device, namely in such a manner that during coupling of the coupling pin to the pull-out element the two latching levers are moved from their latching positions into their release positions, as a result of which their latching functions are disabled and, as a consequence, the pull-out element together with the coupling pin coupled to it can be moved towards the take-up reel of the recording and/or reproducing device. When the pull-out element together with the coupling pin coupled to it is moved back to the inserted cassette by the take-up reel of the recording and/or reproducing device, which is achieved in that the supply reel accommodated in the inserted cassette is driven and the record carrier connected to the coupling element is consequently wound, the situation may arise in the known recording and/or reproducing device that the pull-out element and the coupling element coupled to it are moved back almost though not wholly into the original initial position, in which case the two latching levers cannot return into their latching positions. When in this undesired operating condition the inserted cassette including its coupling pin is removed from the known recording and/or reproducing device and subsequently the first actuating means are activated this results in the pull-out element being moved towards the take-up reel without being coupled to a coupling pin. As a result of this, the pull-out element can no longer be moved back towards the cassette with the aid of a record carrier accommodated in a cassette and the coupling pin connected to this record carrier. This results in a repair case because the pull-out element of the known recording and/or reproducing device can be moved back into its nominal position only by a repair. The situation described above, which can occur though only rarely, is undesirable.

SUMMARY OF THE INVENTION

It is an object of the invention to preclude the problems mentioned hereinbefore and to provide an improved recording and/or reproducing device.

According to the invention, in order to achieve said object, the characteristic features defined in the characterizing part of claim 1 have been provided in a recording and/or reproducing device of the type defined in the opening part of claim 1.

By providing the characteristic features in accordance with the invention it is achieved in a simple and reliable manner that in the case that the pull-out element is not in its nominal position after the coupling element of a cassette has been disengaged from the pull-out element, the pull-out element is reliably moved into its nominal position with the aid of the additional actuating means, the pull-out element then being moved into and retained in said nominal position with the aid of positioning means and latching means, as is also the case in the known recording and/or reproducing device described in the introduction.

In a recording and/or reproducing device in accordance with the invention the additional actuating means of the recording and/or reproducing device may be mounted stationarily and may be arranged in such a manner that the pull-out element retained by the retaining means enters into operative engagement with the stationarily mounted additional actuating means when the retaining means are moved. However, it has proved to be very advantageous if in a recording and/or reproducing device in accordance with the invention, in addition, the characteristic features as defined in claim 2 are provided. Such a construction is simple, saves space and further has the advantage that the actuating movement for the additional actuating means and, consequently, for the pull-out element, to move the pull-out element into its nominal position, is derived from the actuating movement of the retaining means which is performed anyway, as a result of which no separate drive means are required for the additional actuating means.

In a recording and/or reproducing device in accordance with the invention having cooperating actuating elements, it has further proved to be very advantageous when, in addition, the characteristic features as defined in claim 3 are provided. This provides a construction which excels in that it is particularly simple and the additional actuating means cooperate reliably with the retaining means.

In a recording and/or reproducing device in accordance with the invention it has further proved to be very advantageous when, in addition, the characteristic features as defined in claim 4 are provided. This results in a construction which has a particularly low friction and saves power.

The above-mentioned as well as further aspects of the invention will become apparent from the embodiment described hereinafter by way of example and will be elucidated with reference to this example.

The invention will now be described in more detail with reference to the drawings, which show an embodiment given by way of example but to which the invention is not limited.

DETAILED DESCRIPTION OF THE PREFERRED EMBODIMENT

Figure 1:
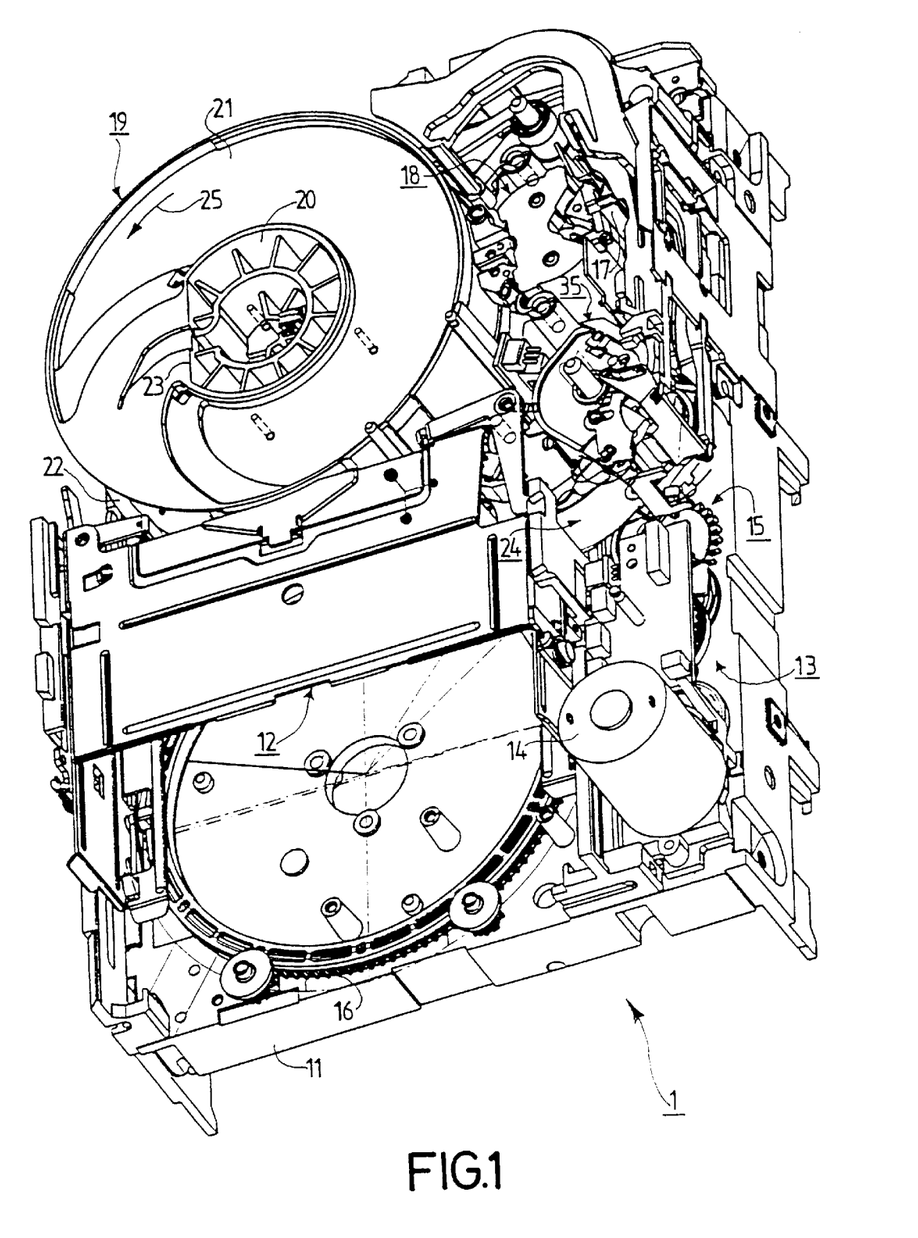
FIG. 1 is an oblique top view of a recording and reproducing device which is an example of an embodiment of the invention.
Figure 2:
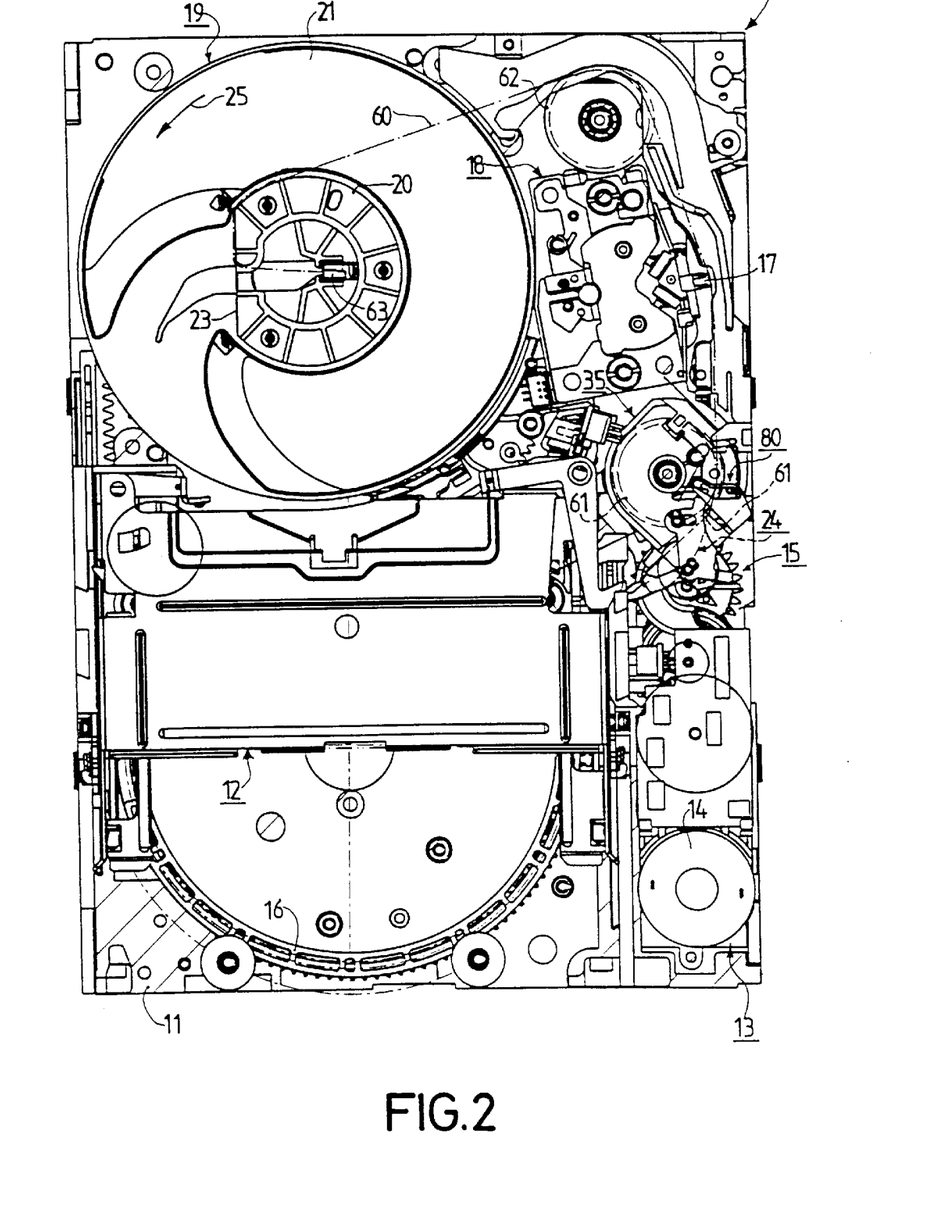
FIG. 2 is a top view of the recording and reproducing device shown in FIG. 1.

FIGS. 1 and 2 show a recording and reproducing device 1 which serves for recording and reproducing digital data and which is capable of storing a huge amount of data. Hereinafter, the recording and reproducing device in accordance with the invention is briefly referred to as the storage device 1.

The storage device 1 is a development of a recording and reproducing device which includes features forming the subject matter of nine patent applications in total, namely the European priority patent applications bearing the application numbers 98 890 332.4, 98 890 333.2, 98 890 334.0, 98 890 335.7, 98 890 336.5, 98 890 337.3, 98 890 338.1, 98 890 339.9 and 98 890 340.7 filed on Nov. 12, 1998. Said recording and reproducing device has already been shown at the Comdex fair of Las Vegas in the USA from Nov. 15, 1998 and is known therefrom. The disclosure represented by the exhibited recording and reproducing device and for a substantial part contained in the nine aforementioned European priority patent applications is incorporated herein by reference. For this reason, the remainder of the description of the storage device shown in FIGS. 1 and 2 is limited to only those areas and parts which are relevant in the present context.

Figure 3:
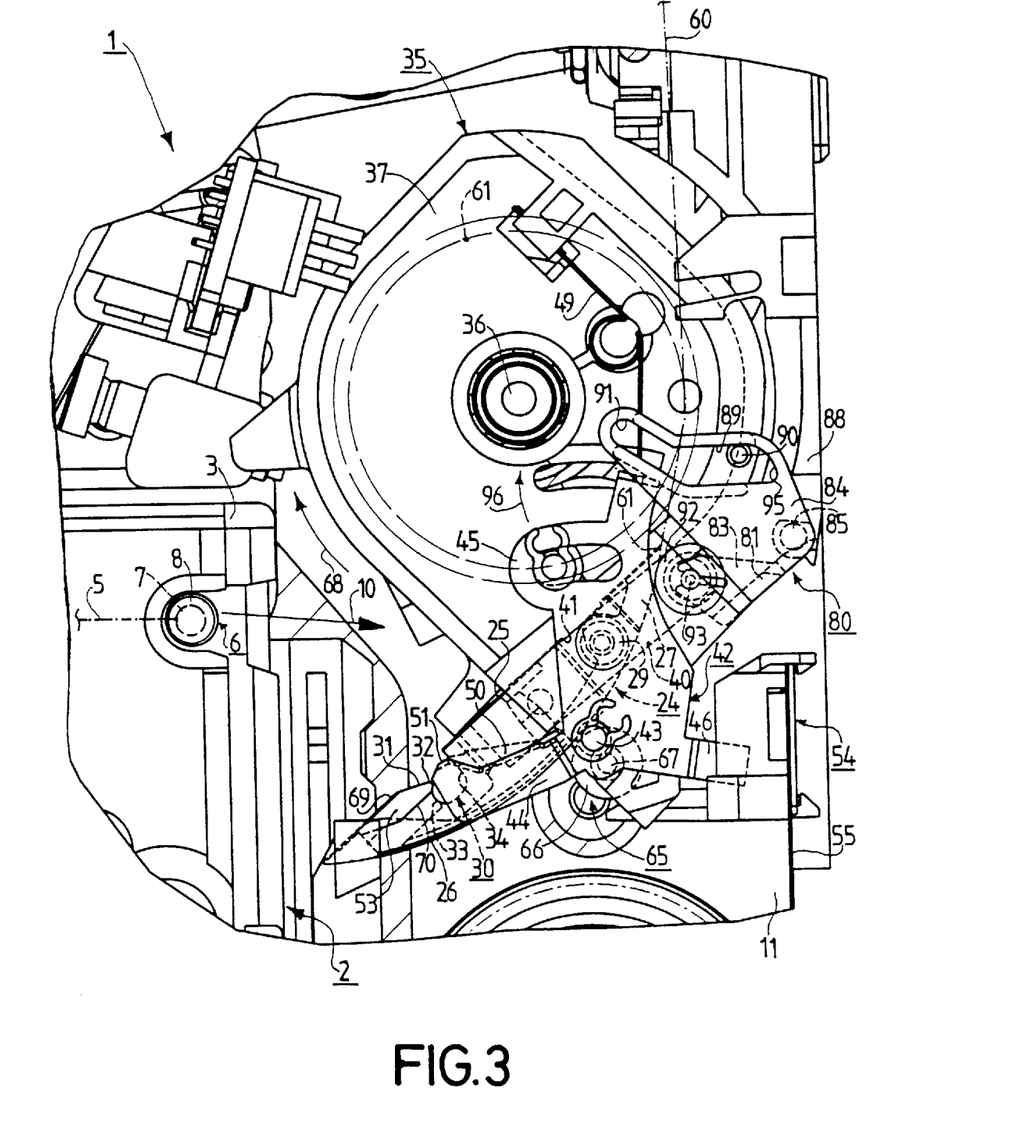
FIG. 3 shows a part of the recording and reproducing device of FIGS. 1 and 2 to an enlarged scale in comparison with FIG. 2, which part includes retaining means for a pull-out element, the retaining means being shown in their standby position.
Figure 4:
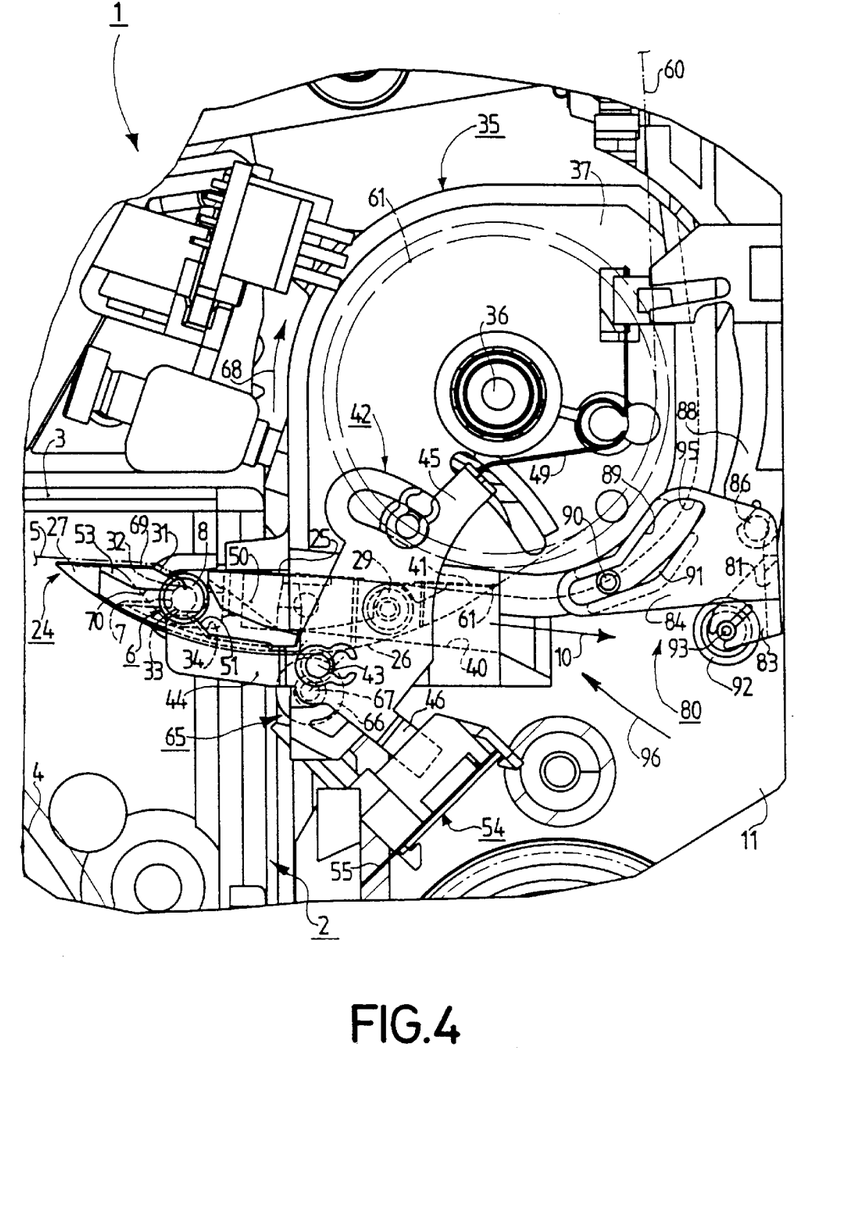
FIG. 4 shows, in the same way as FIG. 3, the part of the recording and reproducing device of FIG. 3, the retaining means being shown in their operating position.

A cassette 2, which is shown only partly in FIGS. 3 and 4, can be loaded into the storage device 1. The cassette 2 has a housing 3. The housing 3 accommodates a rotationally drivable supply reel 4 (see FIG. 4). The supply reel 4 has a reel hub, not shown, on which a record carrier 5 in the form of a tape is wound. In the present case the tape-like record carrier 5 is a magnetic tape 5 which can be scanned along a plurality of tracks which extend in the longitudinal direction of the magnetic tape 5 in order to record or reproduce digital data. In FIGS. 3 and 4 the magnetic tape 5 is shown as a dash-dot line for greater clarity of the representation.

Figure 6:
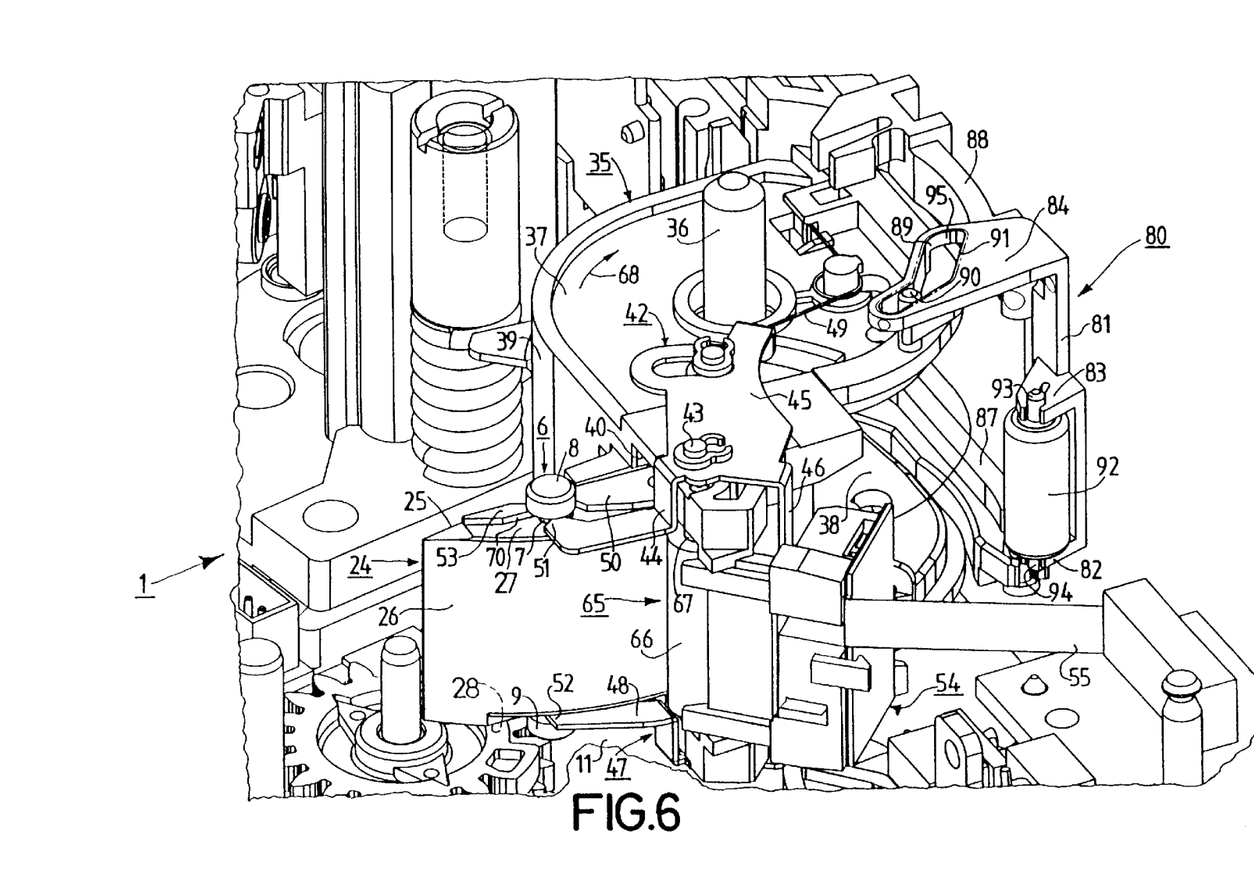
FIG. 6 shows, in the same way as FIG. 5, the part of the recording and reproducing device of FIGS. 3, 4 and 5, the retaining means being shown in their operating position.

The cassette 2 further includes a coupling element 6 connected to the magnetic tape 5 at the free end portion of the magnetic tape 5, in a manner not shown, and held in an initial position, shown in FIGS. 3, 4 and 6, in the cassette 2. The coupling element 6 is held in its initial position with the aid of the magnetic tape 5 but also by separate retaining means, namely with the aid of springs, which are not shown in the Figures. In the present case the coupling element 6 is formed by a coupling pin 6 which has a cylindrical central portion 7 and two flange portions 8 and 9 connected to the ends of the central portion 7. The cassette 2 and, consequently, the coupling pin 6, is not shown in FIGS. 1 and 2. In FIGS. 3 and 4 only the upper flange portion 8 of the coupling pin 6 is shown. In FIG. 6 both flange portions 8 and 9 of the coupling pin 6 are shown. The coupling element 6, i.e. the coupling pin 6, can be pulled out of the cassette 2 in a pull-out direction, which pull-out direction is indicated by an arrow 10 in FIGS. 3 and 4.

The storage device 1 has a chassis 11 which carries the individual constructional units and parts of the storage device 1. Hereinafter, only those of the constructional units and parts are mentioned which are relevant in the present context.

For holding a cassette 2 and moving it from a loading position into an operating position in the storage device 1 the storage device 1 has a movable cassette holder 12. The movable cassette holder 12 is movable along an L-shaped path of movement between a loading position, in which a cassette 2 can be inserted into the cassette holder 12, and an operating position, in which an inserted cassette 2 is in its operating position.

To move the cassette holder 12 and further movable apparatus parts of the storage device 1 the storage device 1 has drive means 13. The drive means 13 include a motor 14 and a gear mechanism 15 by means of which a ring-shaped drive gear wheel 16 is drivable. With the aid of the ring-shaped drive gear wheel 16 cam devices, by means of which the movable cassette holder 12 is movable, can be driven via gear racks.

For scanning a magnetic tape 5 the storage device 1 has a multi-track magnetic head 17. The magnetic head 17 is mounted on an actuator device 18 by means of which the magnetic head 17 is supported so as to be movable perpendicularly to the longitudinal direction of the magnetic tape 5 in order to keep the individual magnet systems of the multi-track magnetic head always aligned with respect to the scanning tracks of the magnetic tape 5, for thus guaranteeing an accurate tracking.

The storage device 1 further includes a rotationally drivable take-up reel 19. The take-up reel 19 comprises a reel hub 20 and two reel flanges 21 and 22. The reel hub 20 has a recess 23 which has basically the shape of a circular segment. The recess 23 has been provided and constructed to receive a pull-out element 24 of the storage device 1. The construction and the function of the pull-out element 24 will be described in detail hereinafter.

The take-up reel 19 is rotationally drivable in a direction indicated by an arrow 25 in order to take up the magnetic tape 5. For the rotational drive of the take-up reel 19 the storage device 1 has a reel drive motor, which is not shown in the Figures, which can drive the take-up reel 19 via a drive element, which is not shown either.

Likewise, the supply reel 4 is rotationally drivable with the aid of a further drive motor of the storage device 1, namely via a crown-like gear wheel which is mesh with crown-like mating gear teeth provided on the supply reel 4 when the cassette 2 occupies its operating position in the storage device 1.

As already stated hereinbefore, the storage device 1 has a pull-out element 24. The construction of the pull-out element 24 is apparent in particular from FIGS. 3 and 4 but also from FIGS. 5 and 6. The pull-out element 24 is adapted to be coupled to the coupling element 6, i.e. to the coupling pin 6, and to pull the coupling pin 6 out of the cassette 2. The pull-out element 24 basically has a cross-sectional shape of a circular segment. The pull-out element 24 is thus basically bounded by a substantially plane side wall 25 at one side and by a side wall 26, which is shaped substantially as an arc of circle, at the other side. Furthermore, the pull-out element 24 is bounded by a substantially plane upper wall 27 at its upper side and by a subsequently plane lower wall 28 at its lower side.

The pull-out element 24 further has a guide pin 29 which traverses the pull-out element 24 and whose two free ends project from the upper wall 27 and the lower wall 28, respectively. In the area of its plane side wall 25 the pull-out element 24 further has a recess 30. The recess 30 has an oblique entry surface 31 which begins at the plane side wall 25 and which ends in a vertex 32. The vertex 32 is adjoined by a circularly arcuate deepened portion 33. The deepened portion 33 changes into a bounding wall 34 which is bent at right angles and which terminates in the plane side wall 25. The recess 30 serves to receive the coupling pin 6, as can be seen in FIG. 4.

The storage device 1 has retaining means 35 which are adapted to detachably retain the pill-out element 24 and which are movable between a standby position shown in FIGS. 1, 2, 3 and 5 and an operating position shown in FIGS. 4 and 6. In the present case the retaining means 35 are pivotable about a spindle 36. The pivotal movement of the retaining means 35 is obtained with the aid of the drive means 13.

The retaining means 35 comprise an upper retaining plate 37 and a lower retaining plate 38 (see FIG. 6), the two retaining plates 37 and 38 being interconnected by a web 39 which extends parallel to the spindle 36, as a result of which a substantially U-shaped construction is obtained. The pull-out element 24 is movable between the upper retaining plate 37 and the lower retaining plate 38. Both the upper retaining plate 37 and the lower retaining plate 38 have a guide slot 40. Each of the two guide slots 40 is engaged by a free end of the guide pin 29 of the pull-out element 24. The two guide slots 40 are bounded by a guide wall 41 at the sides of the two guide slots 40 which face the spindle 36.

An upper locking latching lever 42 is mounted on the retaining plate 37 so as to be pivotable about a spindle 43. The latching lever 42 has an angled construction. The latching lever 42 has a latching arm 44, an actuating arm 45 and a signaling arm 46. Likewise, a lower latching lever 47 is pivotably mounted on the lower retaining plate 38, which lever is of the same construction as the lower latching lever 47 but is mirror-inverted. Of the lower latching lever 47 only the latching arm 48 is visible in FIGS. 5 and 6.

The two latching levers 42 and 47 serve to block a movement of the pull-out element 24 in the pull-out direction 10. The two latching levers 42 and 47 are pivotable between a latching position shown in FIGS. 1, 2, 3 and 5 and a release position shown in FIGS. 4 and 6, the pivotal movement from the latching position into the release position being effected against the force exerted by a wire spring 49 which acts on the actuating arm 45 of the respective latching lever 42 or 47, one spring bearing against the upper retaining plate 37 and the other spring bearing on the lower retaining plate 38. The two wire springs 49, of which only the wire spring 49 that cooperates with the upper latching lever 42 is shown in the Figures, thus urge the two latching levers 42 and 47 towards their latching positions. When the two latching levers 42 and 47 are in their latching positions the two latching levers 42 and 47 each bear against an abutment limb 50 connected to the upper wall 27 and the low wall 28, respectively. When the two latching levers 42 and 47 are in their latching positions the angled free end portion 51 or 52 of each respective latching arm 44 or 48 of the two latching levers 42 and 47, respectively, viewed in the pull-out direction 10, lies before a blocking limb 53 connected to the upper wall 27 or the lower wall 28, respectively, of which only the blocking limb 53 connected to the upper wall 27 is shown in the Figures.

Figure 5:
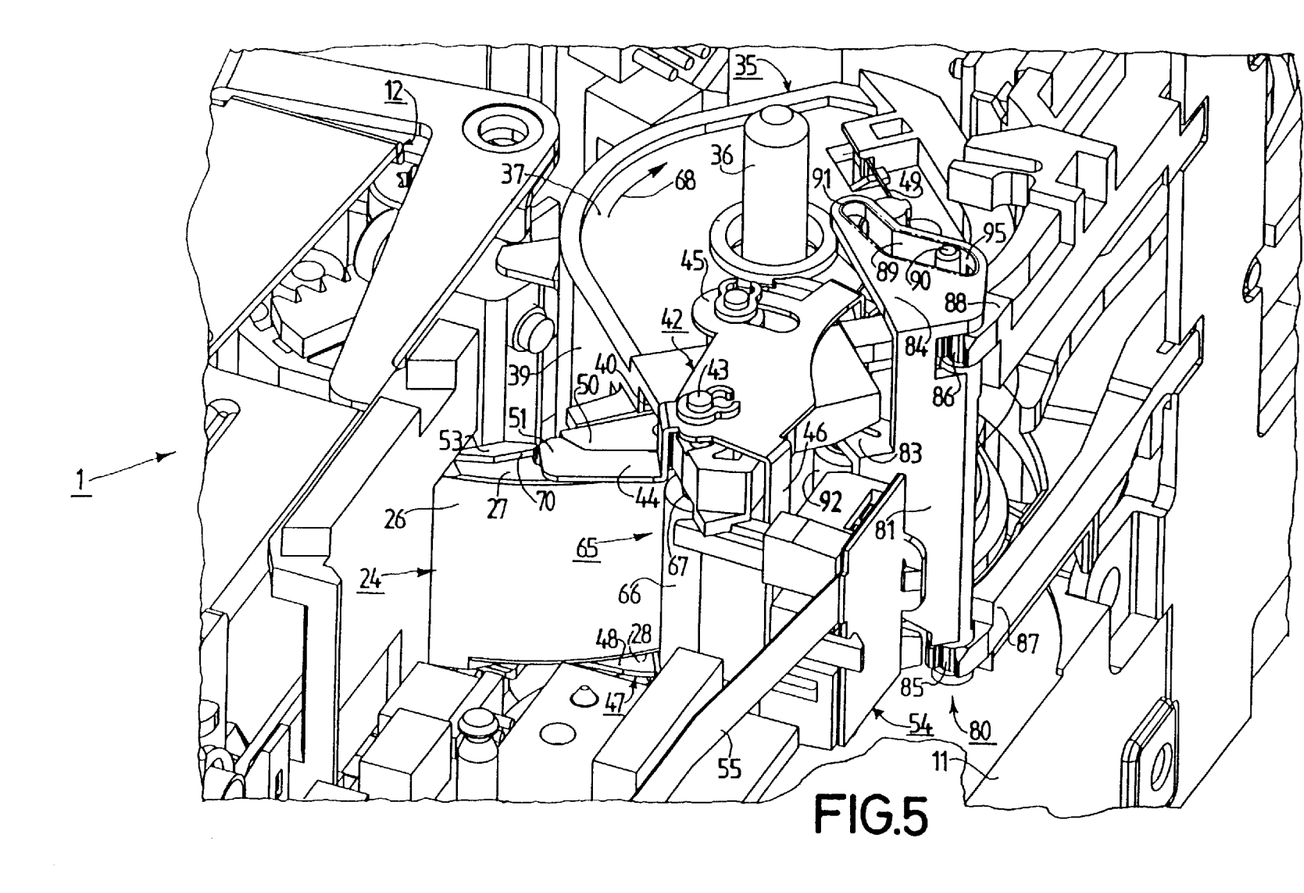
FIG. 5 is an oblique plan view of the part of the recording and reproducing device shown in FIGS. 3 and 4, the retaining means being shown in their standby position.

The pull-out element 24 cannot be moved in the pull-out direction 10 as long as the two latching levers 42 and 47 are in their latching positions (see FIGS. 3 and 5). While the two latching levers 42 and 47 are in their latching positions the two signaling arms 46 of the two latching levers 42 and 47 in the storage device 1 are both in a position which can be detected by means of a photoelectric light-barrier configuration 54. In this situation the photoelectric light-barrier configuration 54 supplies control signals to the electronic circuitry of the storage device 1 via a flexible conductor ribbon 55, which in this case prevents the pull-out element 24 from being driven in the pull-out direction 10.

Since the latching arms 44 and 48 of the two latching levers 42 and 47 engage against the abutment limbs 50 of the pull-out element 24, the cooperating profiles of the abutment limbs 50 and the latching arms 44 and 48 being identical, and since the angled free end portions 51 and 52 of the latching arms 44 and 48 lie before the blocking limbs 53 of the pull-out element 24 viewed in the pull-out direction 10, the pull-out element 24 is positioned in a predetermined position on the retaining means 35 with the aid of the two latching arms 44 and 48 of the two latching levers 42 and 47 when the coupling pin 6 has disengaged from the pull-out element 24, or when a disengagement of the coupling pin 6 from the pull-out element 24 has been effected and a normal mode of operation is active.

As already stated, the retaining means 35 are movable between a standby position (see FIGS. 3 and 5) and an operating position (see FIGS. 4 and 6). During a movement from the standby position into the operating position the pull-out element 24 can be coupled to the coupling pin 6. This coupling, i.e. the cycle of movements during this coupling, will be described in greater detail hereinafter. After the pull-out element 24 has been coupled to the coupling pin 6, which situation is shown in FIGS. 4 and 6, the pull-out element 24 is detachable from the retaining means 35. This is possible because during coupling of the coupling pin 6 to the pull-out element 24 the coupling pin 6, i.e. the central portion 7 of the coupling pin 6, pivots the two latching levers 42 and 47 from their latching positions (see FIGS. 3 and 5) into their release positions (see FIGS. 4 and 6) against the force of the wire springs 49, as a result of which the free end portions 51 and 52 of the latching arms 44 and 48 of the two latching levers 42 and 47 no longer lie before the blocking limbs 53 of the pull-out element 24 viewed in the pull-out direction 10 and the pull-out element 24 is no longer blocked against movement in the pull-out direction 10.

As a result of the movement of the two latching levers 42 and 47 into their release positions the two signaling arms 46 of the two latching levers 42 and 47 are pivoted into an corresponding position in the storage device 1, which is detected by means of the light barrier configuration 54, in response to which corresponding control signals are applied to the electronic circuitry of the storage device 1 via the conductor ribbon 55. In response to these control signals the electronic circuitry of the storage device 1 enables the pull-out element 24 together with the coupling pin 6 coupled to the pull-out element 24 to be driven.

The storage device 1 has first actuating means 60 for driving or for moving the pull-out element 24 together with the coupling pin 6 coupled to the pull-out element 24 towards the take-up reel 19 of the storage device 1. The first actuating means 60 are formed by a pull-out tape 60, which for the sake of clarity is shown as a dash-dot line in FIGS. 2, 3 and 4. The pull-out tape 60 is connected to the pull-out element 24 at a joint 61 in a manner which is not shown and not described any further. The pull-out tape 60 is guided over a tape guide roller 61 arranged between the upper retaining plate 37 and the lower retaining plate 38 and shown only in FIGS. 2, 3 and 4. From the tape guide roller 61 the pull-out tape 60, as is apparent from FIG. 2, is passed to the reel hub 20 of the take-up reel 19 via a further tape guide roller 62 and is attached to the interior of the reel hub 20 with the aid of a fixing element 63 in a manner not shown and described any further. The pull-out element 24 together with the coupling pin 6 coupled to it can be moved away from the retaining means 35 in the pull-out direction 10 and subsequently also away from the retaining means 35 up to the reel hub 20 of the take-up reel 19, in order to achieve that the reel hub 20, on the one hand, and the pull-out element 24 and the coupling pin 6 coupled thereto, on the other hand, are brought together.

In the storage device 1 the construction of the retaining means 35, of the pull-out element 24 and of the two latching levers 42 and 47 is advantageously selected in such a manner that, when the retaining means 35 are moved from their standby position into their operating position and the retaining means 35 approach their operating position or are situated in the area of their operating position, the pull-out element 24 is essentially movable against the pull-out direction 10, which will be explained hereinafter. The storage device 1 further includes second actuating means 65 with the aid of which the pull-out element 24 is essentially movable against the pull-out direction 10 towards the coupling pin 6, which is held in its initial position, when the pull-out element 24 is coupled to the coupling pin 6. In the present case, the second actuating means 65 are connected to the retaining means 35. During the movement of the retaining means 35 from their standby position into their operating position the second actuating means 65 is operatively engageable with the pull-out element 24 in order to move the pull-out element 24 against the pull-out direction 10 to the coupling pin 6, which is held in its initial position.

In the present case the second actuating means 65 include an actuating roller 66 which is rotatably supported on the retaining means 35 and which has bearing pins 67 at each of its two ends, of which the upper bearing pin 67 is rotatably mounted in the upper retaining plate 37 and the lower bearing pin 67 is rotatably mounted in the lower retaining plate 38. The pull-out element 24 has a bounding wall which is adapted to cooperate with the actuating roller 66, namely the circularly arcuate side wall 26. With the aid of the actuating roller 66 the pull-out element 24 is movable, via its circularly arcuate side wall 26, in a direction against the pull-out direction 10 to the coupling pin 6, which is held in its initial position.

When the retaining means 35 are moved in a direction indicated by the arrow 68 from their standby position shown in FIGS. 3 and 5 into their operating position shown in FIGS. 4 and 6, the pull-out element 24 is also moved along in the direction indicated by the arrow 68. Towards the end of the actuating movement as indicated by the arrow 68 a wall portion 69 of the plane side wall 25 of the pull-out element 24 abuts against the central portion 7 of the coupling pin 6, which is retained in its initial position in the cassette 2. As a result of this, the pull-out element 24 can no longer be moved any further in the direction indicated by the arrow 68 in the area of the wall portion 69. Consequently, the free ends of the guide pin 29 of the pull-out element 24 engage against the guide walls 41 of the two guide slots 40 in the upper retaining plate 37 and the lower retaining plate 38. The subsequent movement of the retaining means 35 in the direction indicated by the arrow 68 the actuating roller 65, which is rotatably mounted on the retaining means 35, enters into operative engagement with the circularly arcuate side wall 26 of the pull-out element 24. Owing to the circularly arcuate shape of the side wall 26 this causes the actuating roller 66 to exert a force component having a direction opposite to the pull-out direction 10 on the pull-out element 24. As a result of this force component having a direction opposite to the pull-out direction 10 the pull-out element 24 is moved against the pull-out direction 10, the abutment limbs 50 causing a first pivotal movement of the latching arms 44 and 48 and, consequently, the latching levers 42 and 47 against the force exerted by the wire springs 49. During this movement of the pull-out element 24 against the pull-out direction 10 the central portion 7 of the coupling pin 6 enters into operative engagement with the oblique entry surface 31 of the recess 30, as a result of which the pull-out element 24 is moved along the central portion 7 of the coupling pin 6 with its oblique entry surface 31. This movement proceeds until the vertex 32 engages operatively with the central portion 7 of the coupling pin 6. As of this instant the pull-out element 24 can again be moved in the direction indicated by the arrow 68 owing to the actuating movement of the retaining means 35 in the direction indicated by the arrow 68, thus enabling the central portion 7 of the coupling pin 6 to enter further into the recess 30. During this entry the areas of the central portion 7 of the coupling pin 6 which adjoin the flange portions 8 and 9 enter into operative engagement with the free ends 51 and 52 of the latching arms 44 and 48 of the two latching levers 42 and 47, upon which the latching levers 42 and 47 are moved further in a direction to their release positions. As soon as the central portion 7 of the coupling pin 6 has reached the deepest point of the recess 30 the pull-out element 24 cannot be moved any further in the direction indicated by the arrow 68. At this instant a latching slide arranged in the pull-out element 24 becomes operative, which slide cooperates with the central portion 7 of the coupling pin 6 and ensures that the coupling pin 6 is urged with its central portion 7 into the deepened portion 33 of the recess 30. For the latching slide reference is made again to the European patent application 98 890 335.7. As soon as the coupling pin 6 has been coupled completely and correctly to the pull-out element 24 the two latching levers 42 and 47 assume their release positions, which is detected with the aid of the photoelectric light-barrier configuration 54, to which the electronic circuitry of the storage device 1 is responsive again, inter alia to start the drive of the pull-out tape 60 with the aid of the take-up reel 19, in order to move the pull-out element 24 together with the coupling pin 6, correctly coupled to it, towards the take-up reel 19.

Thus, by the provision of the second actuating means 65, i.e. in essence the actuating roller 66, it is achieved in a simple manner that during coupling of the pull-out element 24 to the coupling pin 6 the coupling pin 6 can remain in its initial position, which is shown clearly in FIGS. 3 and 4, because the pull-out element 24 is moved towards the coupling pin 6, namely substantially against the pull-out direction 10.

After the pull-out element 24 together with the coupling pin 6 coupled to it has been moved towards the take-up reel 19 with the aid of the pull-out tape 60, during which movement the magnetic tape. 5 contained in the cassette 2 has been moved along and has consequently been pulled out of the cassette 2 and led to the take-up reel 19 via the tape guide roller 61, the magnetic head 17 and the further tape guide roller 62, it is possible to record and reproduce digital data with the aid of the magnetic head 17. After such recording or reproduction it may be desired to remove the cassette 2 from the storage device 1. In order to make this possible the magnetic tape 5 together with the coupling pin 6 should be returned into the cassette 2. This is effected by winding the magnetic tape 5 onto the supply reel 4 in the cassette 2. This winding is continued until the coupling pin 6 again occupies its initial position shown in FIGS. 3 and 4.

During normal operation the coupling pin 6 will always resume its original initial position shown in FIGS. 3 and 4 after the whole magnetic tape 5 has been wound onto the supply reel 4. In this case the pull-out element 24 is then also in its nominal position on the retaining means 35 as shown in FIG. 4. In this case the pull-out element 24 is separated from the coupling pin 6, which is held in its initial position, with the aid of the retaining means 35, which are moved from their operating position into their standby position in a direction against that indicated by the arrow 68. The cycle of movements between the pull-out element 24 and the coupling pin 6 is then reversed with respect to the cycle of movements described hereinbefore for the coupling process, which guarantees that the pull-out element 24 assumes and retains its nominal position with respect to the retaining means 35.

However, undesired influences may lead to the situation that during rewinding of the magnetic tape 5 onto the take-up reel 4 of the cassette 2 the coupling pin 6 can no longer be moved back wholly and properly into its initial position as shown in FIGS. 3 and 4, for example as a result of a defective part of the cassette 2 at the location of the initial position. In this case the coupling pin 6 remains in an incorrect position which is offset in the pull-out direction 10 with respect to the initial position as shown in FIGS. 3 and 4 and which is not shown in the Figures. As a result of this, the pull-out element 24 also assumes an incorrect position which is offset in the pull-out direction 10 with respect to the nominal position shown in FIG. 4. Even when both the coupling pin 6 and the pull-out element 24 are in the afore-mentioned incorrect positions, the retaining means 35 can be pivoted from their operating position into their standby position in a direction against that indicated by the arrow 68, in which case the pull-out element 24 is carried along and is moved away from the coupling pin 6 and away from the cassette 2 but the pull-out element 24 is not in its correct nominal position and, consequently, is not blocked against a movement in the pull-out direction 10 with the aid of the latching levers 42 and 47, which is because the free ends 51 and 52 of the latching arms 44 and 48 of the two latching levers 42 and 47 bear against a bounding wall 70 of the blocking limbs 53 and consequently cannot perform their latching functions.

In order to preclude problems in the case of the undesired operating condition described hereinbefore the storage device 1 is provided with additional actuating means 80 and the additional actuating means 80 are constructed and arranged for cooperation with the pull-out element 24, namely in such a manner that, during the movement of the retaining means 35 from their operating position into their standby position and when the pull-out element 24 has moved out of its nominal position in the manner described hereinbefore, the additional actuating means 80 can be brought into operative engagement with the pull-out element 24 in order to move the pull-out element 24 back into its nominal position, which will be described in detail hereinafter. In the present case the additional actuating means 80 in the storage device 1 are arranged to be movable. The additional actuating means 80 are of a substantially U-shaped construction. The additional actuating means 80 comprise a web 81 from which a first limb 82, a second limb 83 and a third limb 84 project laterally. A bearing stub 85 or 86 projects from the first limb 82 and the third limb 84, respectively. By means of the two bearing stubs 85 and 86 the additional actuating means 80 are pivotably mounted, namely on two stationary parts 87 and 88 which form parts of guide means for the pull-out element 24.

The additional actuating means 80 have an actuating element 89 and the retaining means 35 also have an actuating element 90. The actuating element 90 of the retaining means 35 enters into operative engagement with the actuating element 89 of the additional actuating means 80 during the movement of the retaining means 35 from their operating position (see FIGS. 4 and 6) into their standby position (see FIGS. 3 and 5) and drives the additional actuating means 80 so as to move the pull-out element 24 to its nominal position. The actuating element 89 of the additional actuating means 80 is now formed by a bounding wall of a slot 91 in the third limb 84 of the additional actuating means 80. The actuating element 90 of the retaining means 35 is now formed by a pin-shaped projection which projects from the retaining means 35 and which engages in the slot 91. The projection 90 projects from the upper retaining plate 37 of the retaining means 35. The additional actuating means 80 have an actuating member in the form of a rotatable actuating roller 92, which is rotatably mounted with the aid of two bearing stubs 93 and 94, namely between the first limb 82 and the second limb 83 of the additional actuating means 80.

As long as the retaining means 35 are in their operating position as shown in FIGS. 4 and 6, the additional actuating means 80 are in a rest position which is also apparent from FIGS. 4 and 6. When the retaining means 35 are moved against the direction indicated by the arrow 68 from their operating position into their standby position as shown in FIGS. 3 and 5 this causes the pin-shaped projection forming the actuating element 90 of the retaining means 35 to abut against a wall portion 95 of the bounding wall forming the actuating element 89, which initiates the movement of the additional actuating means 80 in the direction indicated by the arrow 96, as a result of which the movement of the actuating roller 92 in the direction indicated by the arrow 96 also begins. As the movement of the retaining means 35 into their standby position proceeds the projection forming the actuating element 90 substantially drives the additional actuating means 80 via the bounding wall forming the actuating element 89, as a result of which the actuating roller 92 is moved further in the direction indicated by the arrow 96 and thus approaches the circularly arcuate side wall 26 of the pull-out element 24. If the pull-out element 24 is then moved from its nominal position shown in FIG. 3 and corresponding to the pull-out direction 10 into an incorrect position, this causes the actuating roller 92 of the additional actuating means 80 to enter into operative engagement with the circularly arcuate side wall 26 and thus move the pull-out element 24 into the nominal position shown in FIG. 3, which movement corresponds to a movement against the pull-out direction 10.

As a result of the provision of the additional actuating means 80 and, particularly, the actuating roller 92 of the additional actuating means 80 it is ensured in a simple and reliable manner that, in the event that during the movement of the retaining means 35 from their operating position into their standby position the pull-out element 24, which is retained by the retaining means 35, is no longer in its nominal position, the pull-out element 24 is moved into its nominal position. This precludes problems which may arise as a result of the fact that after the disengagement of the coupling pin 6 the pull-out element 24 is not in its nominal position with respect to the retaining means 35.

What is claimed is:

1. A recording and/or reproducing device (1) adapted for loading a cassette (2), the cassette comprising a housing (3) and a rotationally drivable supply reel (4) accommodated in the housing (3) and a record carrier (5) in the form of a tape wound onto the reel hub of the supply reel (4) and a coupling element (6) connected to the record carrier (5) in the area of the free end of the record carrier (5), wherein the coupling element is held in an initial position permitting the coupling element to be pulled out of a cassette (2) in a pull-out direction (10), and said recording and/or reproducing device comprising a rotationally drivable take-up reel (19) having a reel hub (20), and which has a pull-out element (24) constructed to be coupled to the coupling element (6) and to pull the coupling element (6) out of the cassette (2), and which has a retainer (35) adapted to detachably retain the pull-out element (24) by a retaining actuator (90) and which is movable between a standby position and an operating position, so as to permit a coupling of the pull-out element (24) to the coupling element (6) during a movement from the standby position to the operating position, and from said retainer the pull-out element (24) is disengageable after coupling to the coupling element (6), and on which, when the coupling element (6) has become disengaged from the pull-out element (24) and operation is normal, the pull-out element (24) is positioned in a nominal position, which has a first actuator (60) with which the pull-out element (24), together with the coupling element (6) coupled to it, is first movable in the pull-out direction (10) and subsequently away from the retainer (35) and up to the reel hub (20) of the take-up reel (19), so that (a) the reel hub (20), and (b) the pull-out element (24) and the coupling element (6) coupled thereto, are brought together, further comprising:

coupling element retrieval means for retrieving the coupling pin (6) when the coupling pin (6) has been pulled out of the cassette (2) and the pull-out element has disengaged from the coupling pin (6), and with said pull-out element (24) being located out of its nominal position, said coupling element retrieval means including an actuating means (80) having an actuating element (89) that is arranged for cooperation with the actuator element (90) of the retainer (35) in order to move the pull-out element (24), so that during movement of the retainer (35) from the operating position into the standby position, when the pull-out element (24) has been moved out of its nominal position and disengaged from the coupling pin (6), the actuating element (89) is brought into operative engagement with the pull-out element (24) in order to move the pull-out element (24) into its nominal position.

2. A recording and/or reproducing device (1) adapted for loading a cassette (2), the cassette comprising a housing (3) and a rotationally drivable supply reel (4) accommodated in the housing (3) and a record carrier (5) in the form of a tape wound onto the reel hub of the supply reel (4) and a coupling element (6) connected to the record carrier (5) in the area of the free end of the record carrier(5), wherein the coupling element is held in an initial position permitting the coupling element to be pulled out of the cassette (2) in a pull-out direction (10), and said recording and/or reproducing device comprising a rotationally drivable take-up reel (19) having a reel hub (20), and which has a pull-out element (24) constructed to be coupled to the coupling element (6) and to pull the coupling element (6) out of the cassette (2), and which has a retainer (35) adapted to detachably retain the pull-out element (24) and which is movable between a standby position and an operating position, so as to permit a coupling of the pull-out element (24) to the coupling element (6) during a movement from the standby position to the operating position, and from said retainer the pull-out element (6) is disengageable after coupling to the coupling element (6), and on which, when the coupling element (6) has become disengaged from the pull-out element (24) and operation is normal, the pull-out element (24) is positioned in a nominal position, which has a first actuator (60) with which the pull-out element (24), together with the coupling element (6) coupled to it, is first movable in the pull-out direction (10) and subsequently away from the retainer (35) and up to the reel hub (20) of the take-up reel (19), so that (a) the reel hub (20), and (b) the pull-out element (24) and the coupling element (6) coupled thereto, are brought together, further comprising:

a second actuator (80) that is adapted for engagement with the pull-out element (24), so that during movement of the retainer (35) from the operating position into the standby position, when the pull-out element (24) has been moved out of its nominal position, the second actuator (80) is brought into operative engagement with the pull-out element (24) in order to move the pull-out element (24) into its nominal position;

wherein the second actuator (80) in the recording and/or reproducing device is arranged so as to be movable, and the second actuator (80) has an actuating element (89), and the retainer (35) includes an actuating element (90), which during movement of the retainer (35) from an operating position into a standby position enters into operative engagement with the actuating element (89) of the second actuator (80) and drives the second actuator (80) so as to move the pull-out element (24) into its nominal position; and wherein the actuating element (89) of the second actuator (80) is formed by a bounding wall of a slot (91) in a part (84) of the second actuator (80), and the actuating element (90) of the retainer (35) is formed by a pin-shaped projection which projects from the retainer (35) and which engages in the slot (91).

3. A recording and/or reproducing device (1) adapted for loading a cassette (2), the cassette comprising a housing (3) and a rotationally drivable supply reel (4) accommodated in the housing (3) and a record carrier (5) in the form of a tape wound onto the reel hub of the supply reel (4) and a coupling element (6) connected to the record carrier (5) in the area of the free end of the record carrier (5), wherein the coupling element is held in an initial position permitting the coupling element to be pulled out of the cassette (2) in a pull-out direction (10), and said recording and/or reproducing device comprising a rotationally drivable take-up reel (19) having a reel hub (20), and which has a pull-out element (24) constructed to be coupled to the coupling element (6) and to pull the coupling element (6) out of the cassette (2), and which has a retainer (35) adapted to detachably retain the pull-out element (24) and which is movable between a standby position and an operating position, so as to permit a coupling of the pull-out element (24) to the coupling element (6) during a movement from the standby position to the operating position, and from said retainer the pull-out element (6) is disengageable after coupling to the coupling element (6), and on which, when the coupling element (6) has become disengaged from the pull-out element (24) and operation is normal, the pull-out element (24) is positioned in a nominal position, which has a first actuator (60) with which the pull-out element (24), together with the coupling element (6) coupled to it, is first movable in the pull-out direction (10) and subsequently away from the retainer (35) and up to the reel hub (20) of the take-up reel (19), so that (a) the reel hub (20), and (b) the pull-out element (24) and the coupling element (6) coupled thereto, are brought together, further comprising:

a second actuator (80) that is adapted for engagement with the pull-out element (24), so that during movement of the retainer (35) from the operating position into the standby position, when the pull-out element (24) has been moved out of its nominal position, the second actuator (80) is brought into operative engagement with the pull-out element (24) in order to move the pull-out element (24) into its nominal position;

wherein the second actuator (80) in the recording and/or reproducing device is arranged so as to be movable, and the second actuator (80) has an actuating element (89), and the retainer (35) includes an actuating element (90), which during movement of the retainer (35) from an operating position, into a standby position enters into operative engagement with the actuating element (89) of the second actuator (80) and drives the second actuator (80) so as to move the pull-out element 24 into its nominal position;

wherein the second actuator (80) has a rotatable actuating roller (92) arranged so as to move the pull-out element (24) into its nominal position.

* * * * *